Patented Aug. 16, 1949

2,479,298

UNITED STATES PATENT OFFICE 2,479,298

WRINKLE COATING COMPOSITION CONSISTING OF A MIXTURE OF CONJUGATED DOUBLE-BONDED OIL AND AN AQUEOUS EMULSION OF POLYVINYL ACETATE RESIN

Nathan T. Beynon, Dayton, Ohio, assignor to New Wrinkle, Inc., Wilmington, Del., a corporation of Delaware No Drawing. Application June 9, 1945, Serial No. 598,647

2 Claims. (Cl. 260—23)

This invention relates to coating composition, and more particularly deals with coating compositions adapted to dry to a wrinkle.

Hitherto wrinkle drying coating compositions have been of two types; varnish type and alkyd type.

Varnish type wrinkle drying coating compositions consist essentially of a varnish base including a wrinkling oil in admixture with drier and solvent; while alkyd base wrinkle drying coating compositions consist essentially of an alkyd resin in admixture with drier and a solvent.

The production of both varnish base and alkyd base wrinkle drying coating compositions requires the use of cooking facilities. The purpose of the present invention is to produce a new type of wrinkle drying coating composition wherein the cooking step is completely dispensed with. In other words, the coating compositions which are the subject matter of the present invention are prepared by compounding the competent parts thereof without the necessity of cooking.

According to the present invention a wrinkling oil (that is to say, an oil which includes conjugated double bonds in its chemical structure) is admixed with an aqueous emulsion of a synthetic resin or with the synthetic resin in dry form in a ratio of from 10 parts to 50 parts of synthetic resin to 100 parts of wrinkling oil.

To the resulting mixture may be added, if so desired, from 40 to 80% of a pigment paste comprising for example, two-thirds pigment and one-third wrinkling oil by weight. This pigment paste is thoroughly blended into the mixture of synthetic resin and wrinkling oil to produce a homogeneous composition.

To this homogeneous composition is added a quantity of solvent such as naphtha, toluol, xylol, or mixtures thereof, or any other solvent such as customarily employed in varnish formulations, in quantity sufficient to produce a coating of the desired viscosity.

For example, a coating of suitable viscosity for application by spreading may consist of 40 parts by weight of synthetic resin, 100 parts by weight of wrinkling oil, 60 parts by weight of pigment paste, and 10 parts by weight of naphtha.

The use of synthetic resins either dry or as emulsions in admixture with wrinkling oils for producing wrinkle drying coating composition is new in the art; in fact, it has been hitherto considered impossible to admix synthetic resin emulsions in wrinkle drying coating compositions of any sort because the emulsion acted as an inhibitor of wrinkle formation, and caused "blobs" when the resulting product was sprayed. The cold addition of dry resin was considered impossible because it would fail to dissolve or disperse in the oil.

The texture of the wrinkle pattern obtained according to the present invention may be controlled or altered by selection of the type of synthetic resin used. In addition, wrinkle patterns or textures hitherto unobtainable may be produced varying the amount of synthetic resin employed in the formulation. In addition, this new type of wrinkle drying coating composition including synthetic resins responds to temperature variation during the initial drying or texturing period to such an extent that great variety of textures or patterns may be obtained.

It is believed that the underlying theory governing the production of wrinkle drying coating composition including synthetic resins is as follows:

The mixture of synthetic resin and wrinkling oil consists of two component parts which are compatible with each other at the time and under the conditions of mixing; however, during the drying or film-forming period these ingredients separate into distinct phases, and thereby the texture of the wrinkle pattern is altered depending on the relative proportion or ratio of the two component parts. It will be understood, of course, that this theory is offered merely in explanation of observed facts, and that it is not intended thereby to limit this invention.

Polyvinyl acetate resin in the form of an aqueous emulsion has been successfully used in the practice of this invention. Each resin may be employed successfully in ratios of from 10 parts to 50 parts of resin (original basis) to each 100 parts of wrinkling oil, and has been so employed in the practice of this invention.

As has been noted hereinbefore, wrinkling oils are oils which include conjugated double bonds in their chemical structure. They may be native oils such as tung oil and oiticica oil, or they may be modified oils such as dehydrated castor oil (either blown or unblown), blown linseed oil and alkali isomerized oils prepared from normally non-drying oils such as peanut oil and cottonseed oil, or they may be any other type of fatty oil which includes conjugated double bonds in its chemical structure either in the native state or after treatment causing conjugation of isolated double bonds.

Wrinkle drying coating compositions made according to the method of this invention have been successfully applied on paper, fabric and other similar flexible materials with great success. The composition has been applied by spraying, spreading, and rolling, and the resulting film has been dried at a 130° F. for an additional period of from 30 to 60 minutes at 180° F.

It will be understood that while there have been given therein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. As a new composition of matter, a wrinkle drying coating composition consisting of an uncooked homogeneous mixture of 100 parts by weight of conjugated double-bonded oil and from 10 to 50 parts by weight of polyvinyl acetate resin in the form of an aqueous emulsion.

2. The method of making a wrinkle drying coating composition which consists in admixing at room temperature 100 parts by weight of conjugated double-bonded oil and from 10 to 50 parts by weight of an oil-soluble polyvinyl acetate resin in the form of an aqueous emulsion; adding thereto approximately 40 to 80 parts by weight of a pigment paste consisting of two-thirds by weight of pigment and one-third by weight of conjugated double-bonded oil; and adding to the resulting mixture a varnish solvent in a quantity sufficient to obtain a predetermined viscosity.

NATHAN T. BEYNON.

REFERENCES CITED

The following references are of record in the file of this patent:

UNITED STATES PATENTS

| Number | Name | Date |
|---|---|---|
| 1,294,836 | Schlatter | Feb. 18, 1919 |
| 1,934,034 | Burgman | Nov. 7, 1933 |
| 2,237,753 | Dangeljajer et al. | Apr. 8, 1941 |
| 2,259,497 | Soday | Oct. 21, 1941 |
| 2,259,980 | West et al. | Oct. 21, 1941 |
| 2,277,259 | Schnabel et al. | Mar. 24, 1942 |

OTHER REFERENCES

Technical Data Bulletin No. 4-243 by du Pont de Nemours and Co., rec'd. Nov. 13, 1943, 2 pp.

Page 3, Polyvinyl Alcohol by du Pont de Nemours and Co. 1940.